(12) United States Patent
Goss et al.

(10) Patent No.: US 6,202,824 B1
(45) Date of Patent: Mar. 20, 2001

(54) VEHICLE FOR FACILITATING ASSEMBLY VERIFICATION TEST

(75) Inventors: Virginia J. Goss, Wendell; James N. Smith, Raleigh, both of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/333,432

(22) Filed: Jun. 15, 1999

(51) Int. Cl.[7] .............. B65G 37/00; B65G 43/00; B65G 43/08; B65G 49/02

(52) U.S. Cl. .................. 198/346.2; 198/346.1; 198/574

(58) Field of Search .............. 198/346.1, 369.1, 198/574, 346.2

(56) References Cited

U.S. PATENT DOCUMENTS

| | | | | |
|---|---|---|---|---|
| 4,478,329 | * | 10/1984 | Heiz | 198/574 X |
| 4,747,193 | * | 5/1988 | Hashidate et al. | 198/346.1 X |
| 4,763,771 | * | 8/1988 | Geerts | 198/574 X |
| 5,664,929 | * | 9/1997 | Esaki et al. | 198/346.1 X |
| 5,810,541 | * | 9/1998 | Casey et al. | 198/346.1 X |
| 5,873,449 | * | 2/1999 | Davenport | 198/346.1 X |

* cited by examiner

*Primary Examiner*—Christopher P. Ellis
*Assistant Examiner*—Gene O. Crawford
(74) *Attorney, Agent, or Firm*—Bernard D. Bogdon; Felsman Bradley Vaden Gunter & Dillon, LLP

(57) ABSTRACT

An assembly verification test uses a sliding cart to transport work-in-process units from an assembly facility to a test area. The cart has a generally square frame with multiple vertical and horizontal frame members. The front end of the cart has wheels that engage the floor. The rearward end of the cart has wheels that are vertically offset from the front wheels and ride along a chassis of the test station that is located above the floor. The upper end of the cart has guide rails for slidably receiving work unit trays from assembly and offloading the trays to the test area. The wheels allow the cart to move laterally from side to side along the length of the test area so that the cart may be easily repositioned in front of any of the test slots.

3 Claims, 11 Drawing Sheets

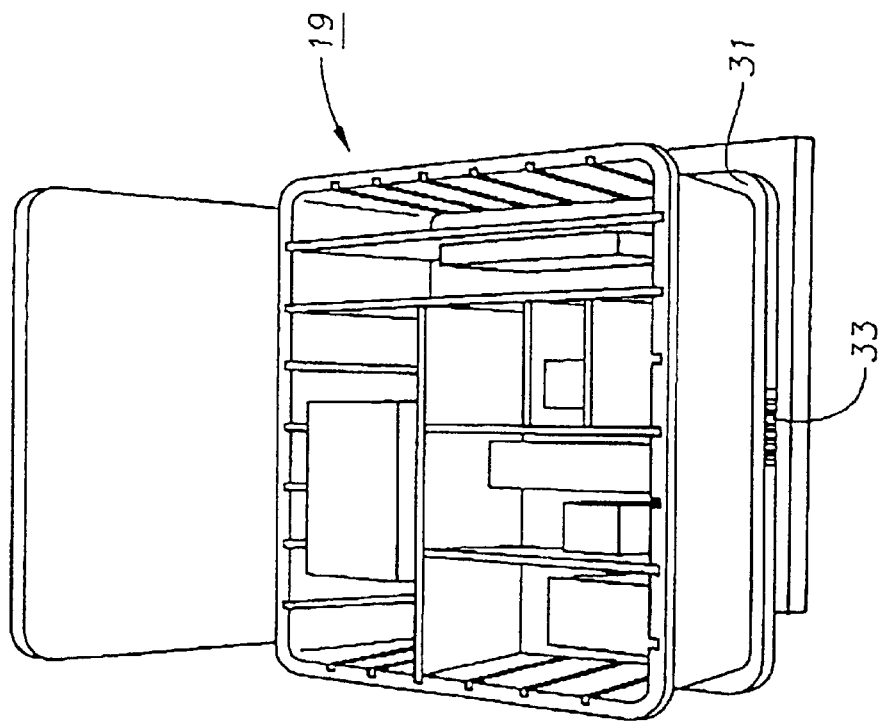
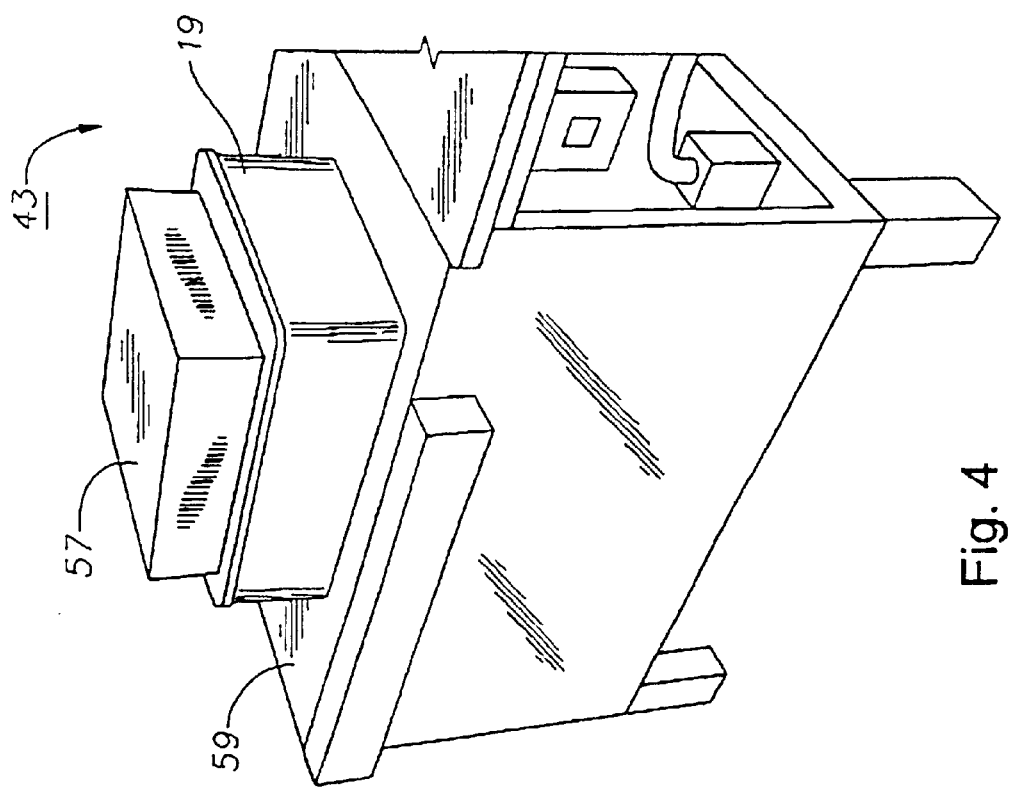

VEHICLE FOR FACILITATING ASSEMBLY VERIFICATION TEST

BACKGROUND OF THE INVENTION

1. Technical Field

The present invention relates to the process of assembling and testing a product, and, more specifically, a highly flexible process capable of handling both large jobs and small jobs efficiently by minimizing any impact from job change-over and optimizing cycle times.

2. Background Art

A manufacturing process for electronic equipment such as computers includes assembly, inspection, and testing. Assembly involves installing the various components including cables, labels, screws, etc. The assembly operators must be able to build many different products. The smaller the job size, the more frequently the operators will have to change to a new product. Each unit is inspected and tested to ensure proper cable routing and component installation.

In computer manufacturing, testing typically includes a configuration test, a run-in test, a software pre-load onto the hardfile, a verification test, and a high potential (hi-pot) test. These tests are either initiated from a floppy disk or through a Local Area Network (LAN) with minimal code on the diskette. A LAN is the most efficient way to test the product and pre-load the hardfile. This requires the installation of a LAN card in the assembly process. For customers that did not request a LAN card, a temporary slave card is installed which must be removed prior to the verification test. A hi-pot test is required to verify that the unit is safe and to get UL approval.

If a unit fails one or more of the tests, it must be debugged. This includes both component failures and workmanship-induced failures. Replacement parts must be made available to the debug operator. Once the failure is verified, the faulty part is tagged and replaced. A floor control system is used to track the unit through the process. The system ensures that all steps are completed and all tests are passed.

Manufacturing setup time includes parts presentation to assembly and debug, ensuring the correct test code and preload are available, and familiarizing the operators with the assembly process for the new product. In a manufacturing cell environment where operations have been streamlined, it is critical that setup times are reduced. It is also critical that cycle times are optimized to minimize the time from when an order is placed until it is shipped.

There are many ways to lay out a manufacturing line to maximize efficiency depending on the business strategy. If the strategy is based on large orders of a specific product (i.e. build to plan, build to order for a dealer, etc.), large lines with material handling solutions are often implemented. If the strategy is oriented towards small orders (i.e. build to order for specific customers), workcells with minimum material handling are typically used.

Conventional methods typically work well for one strategy or the other, but not both. A large manufacturing line usually has separate areas for assembly, inspection, configuration, run-in, pre-load, card removal, verification, hi-pot, and packaging, including queues between each area. Large lines work best when they are fully staffed; otherwise, significant balancing between operations is required. One downfall of this approach is the intrinsic separation between operations (an assembler has little awareness of how a workmanship error impacts configuration). If the inspection area finds an error, there may already be numerous units in the queue with the same error. These circumstances reduce the ownership felt by the operators. In addition to this risk, WIP inventory is higher due to the queues between operations.

Testing products on a large line is typically done to optimize workload. Gravity conveyors, carts, or other equipment is frequently used for this purpose. Due to the sensitivity of hardfiles, a lane or cart has to be fully loaded before the units are powered on for testing. The sensitivity is due to the risk of a unit being brought into test hitting one that is already powered on, thereby causing possible hardfile damage. Consequently, this risk increases the cycle time for those units that arrive early to a lane. If a unit in the middle of the batch fails, the whole batch is held up during repair. In addition, it is more efficient for the operator when all the units in a batch are the same. Otherwise differences in test times and processes reduce efficiency as all of the units must wait for the longest requirement to complete. For large batches of the same product, these impacts are minimized.

Cells are usually designed for specific product families using Group Technology theories. The "textbook" cell is often used for machining operations, not assembly and test. The traditional Group Technology workcell recommends dedicating cells to specific products (e.g. different cells would be used for each product type with different parts or processes). Because of varying product demand, dedicating cells to specific product types restricts the ability of process designers to optimize capacity and staffing. For example, some manufacturers have implemented cellular-based concepts that divide operations. These designs have assembly cells and separate testing and burn-in areas. Thus, although the assembly process is improved, WIP is increased due to queues, loss of ownership resulting from separation of operations, and staffing imbalances between areas.

Unfortunately, it is impractical to install both manufacturing cells and large lines to solve these problems. Such a facility would incur even higher costs and decreased efficiency since fixed support structures would be required in both areas. Physically separate lines would require management to round up for staffing needs in both places, thereby reducing their ability to optimize staffing.

What is needed is a manufacturing line with ultimate flexibility that is able to assemble and test any product on any cell efficiently regardless of job size.

SUMMARY OF THE INVENTION

An assembly verification test uses a sliding cart to transport work-in-process units from an assembly facility to a test area. The cart has a generally square frame with multiple vertical and horizontal frame members. The front end of the cart has wheels that engage the floor. The rearward end of the cart has wheels that are vertically offset from the front wheels and ride along a chassis of the test station that is located above the floor. The upper end of the cart has guide rails for slidably receiving work unit trays from assembly and offloading the trays to the test area. The wheels allow the cart to move laterally from side to side along the length of the test area so that the cart may be easily repositioned in front of any of the test slots.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a perspective view of a station in the assembly portion of FIG. 1.

FIG. 5 is a perspective view of a tote constructed in accordance with the invention.

BEST MODE FOR CARRYING OUT THE INVENTION

Figure 1:
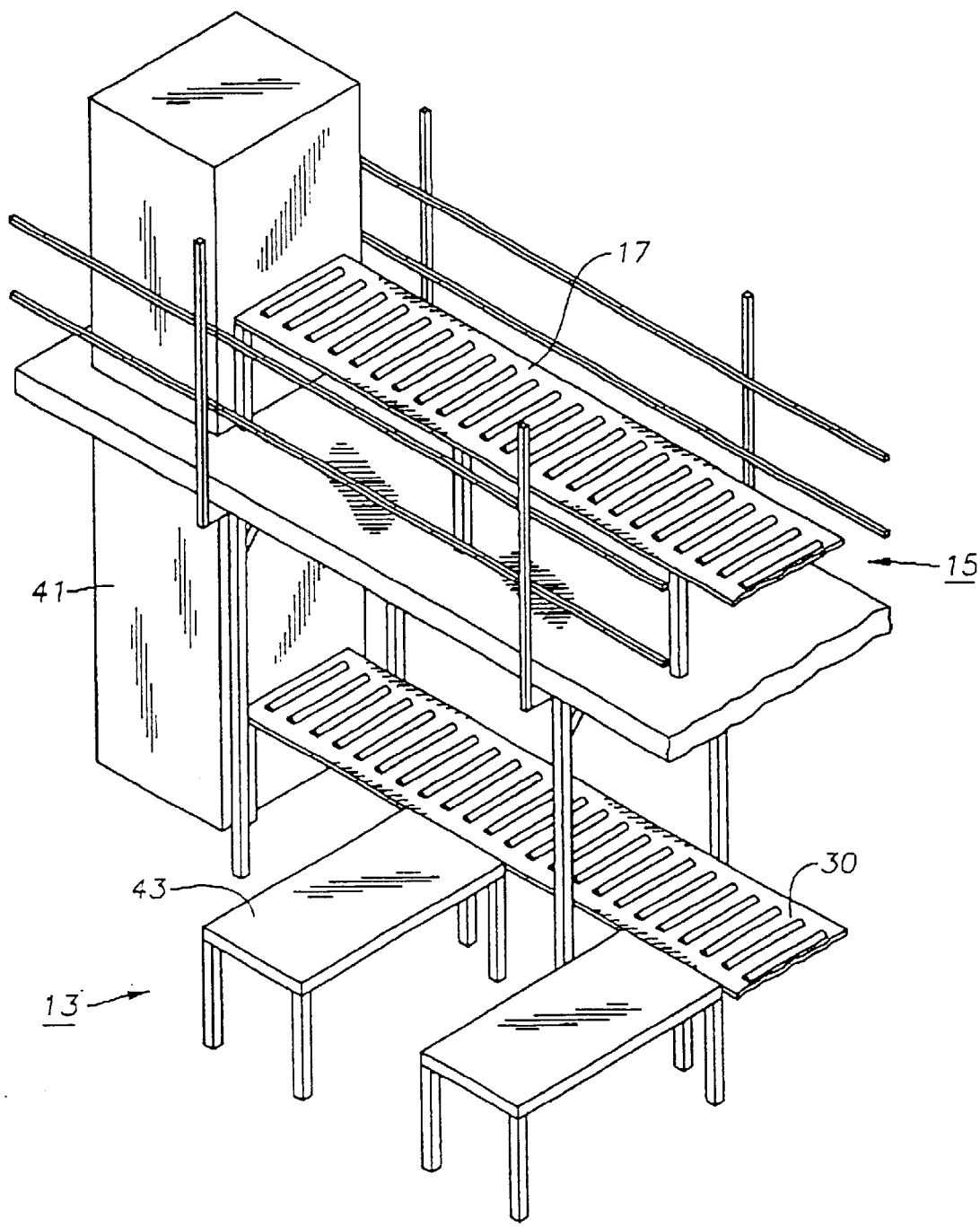
FIG. 1 is perspective side view of an assembly and materials handling portion of a manufacturing line constructed in accordance with the invention.
Figure 17:
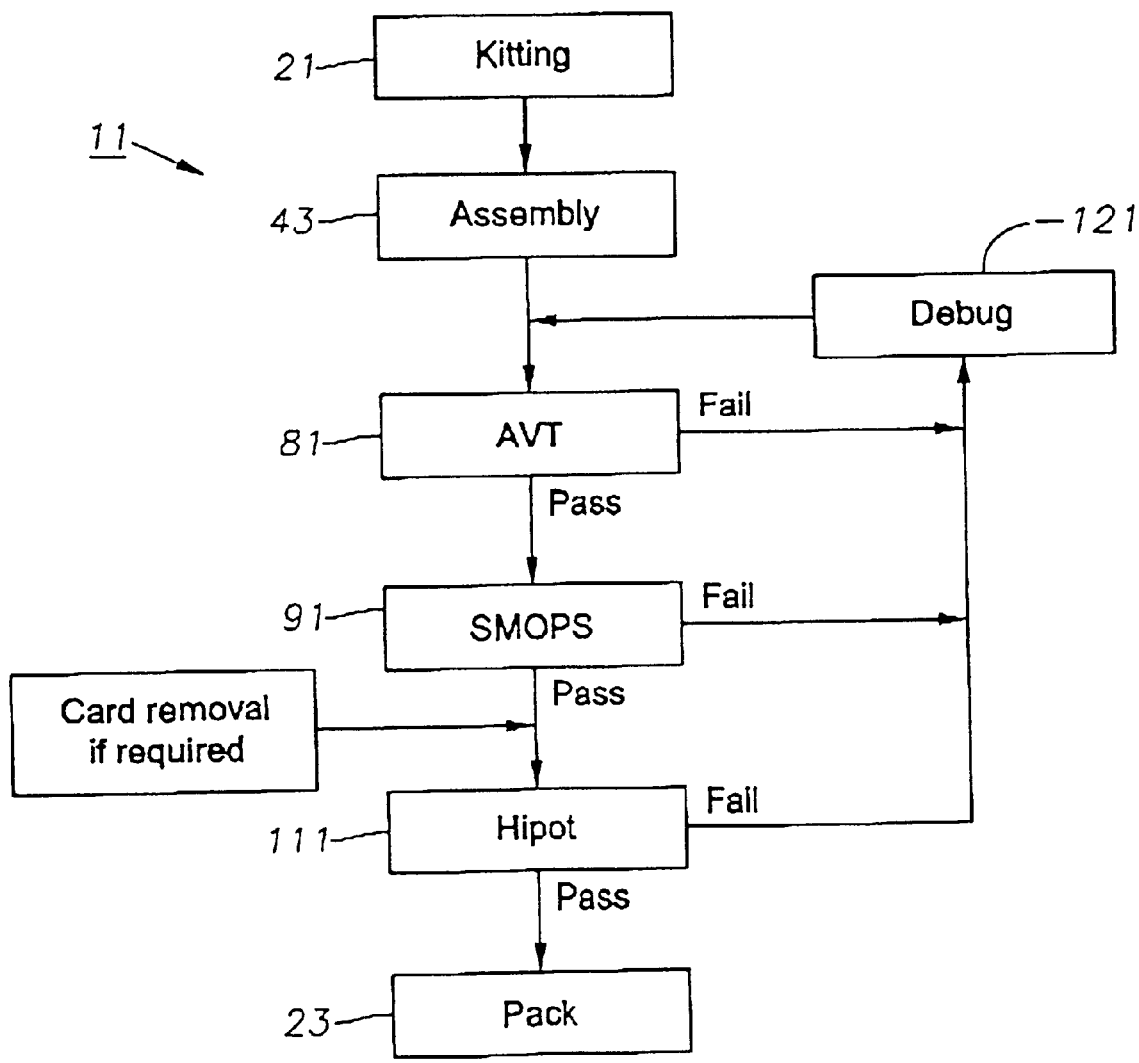
FIG. 17 is a summary flow chart for the manufacturing line of FIG. 1.

Referring to FIGS. 1 and 17, a manufacturing line 11 having a combination of cells 13 and a material handling system (MHS) 15 is shown. The material handling system 15 uses overhead conveyors 17 to deliver totes 19 (FIG. 5) from a card population lab (CPL) kitting area 21 to the correct cell 13 and from the cells 13 to a packaging area 23. Each tote 19 is transported on a tray 31 having a barcode label 33 that is used for tracking its respective tote 19.

After exiting the kitting area 21, the totes 19 travel and queue at each cell 13 as directed by the material handling system 15. As the totes 19 travel along the conveyors 17, system scanners (not shown) located at each intersection will scan the labels 33 on the trays 31. If a particular label 33 cannot be read, the system 15 discharges the tote 19 from the conveyor 17 at a detecting scanner (not shown) and notifies maintenance. Each pair of cells 13 shares a conveyor lift 41 (FIG. 1) that brings the totes 19 down from the overhead conveyor 17 to a floor level conveyor 30. The conveyor lift 41 also takes empty totes 19 back to the overhead return. Totes 19 travel to a plurality of assembly stations 43 (FIGS. 4 and 5) at each cell 13 waiting to be called in by the operators. Empty totes 19 are sent out by the operator at each station 43 and returned to selected spurs in the kitting area 21 (FIG. 1) where they are queued.

In the preferred embodiment, manufacturing line 11 comprises 24 cells 13. Each cell 13 is identical and requires floor space measuring approximately 60 by 40 feet. A logistics material financing (LMF) job can be loaded to any combination of the 24 cells 13. Jobs can be stacked for a cell 13 so when one job has been completed, the tote 19 for the next job is immediately available for assembly. The Manufacturing Production Controller (MPC) determines which jobs get built at each cell 13 based on size, product type, and priority. This is input into MHS 15 and can be changed as required during each shift. Based on this input, each time a cell queue spot is freed (i.e. a tote 19 is pulled into the cell 13), MHS 15 sends a request to the kitting area 21 for another tote 19. MHS 15 knows the size of the order and the number of units already started, so when the last tote 19 has been started for that job, it automatically starts the next job.

Figure 2:
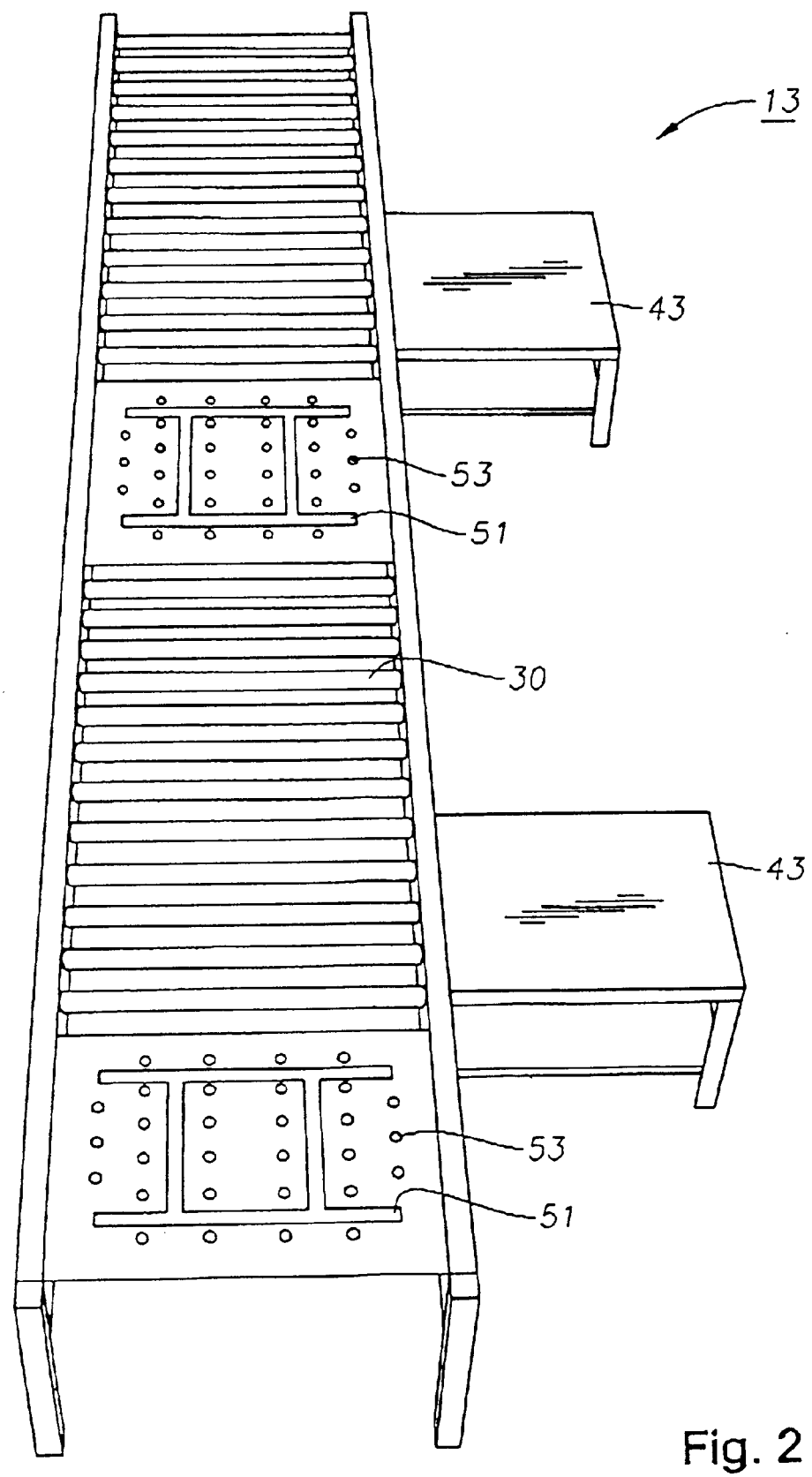
FIG. 2 is an enlarged perspective end view of the assembly portion of FIG. 1.
Figure 6:
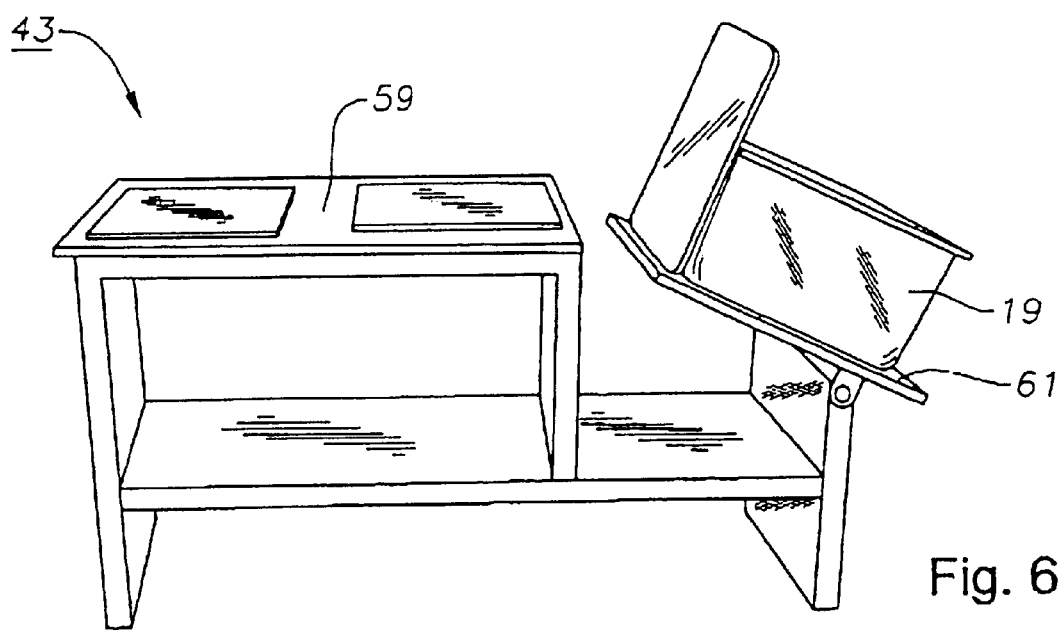
FIG. 6 is a side perspective view of the station of FIG. 4.
Figure 7:
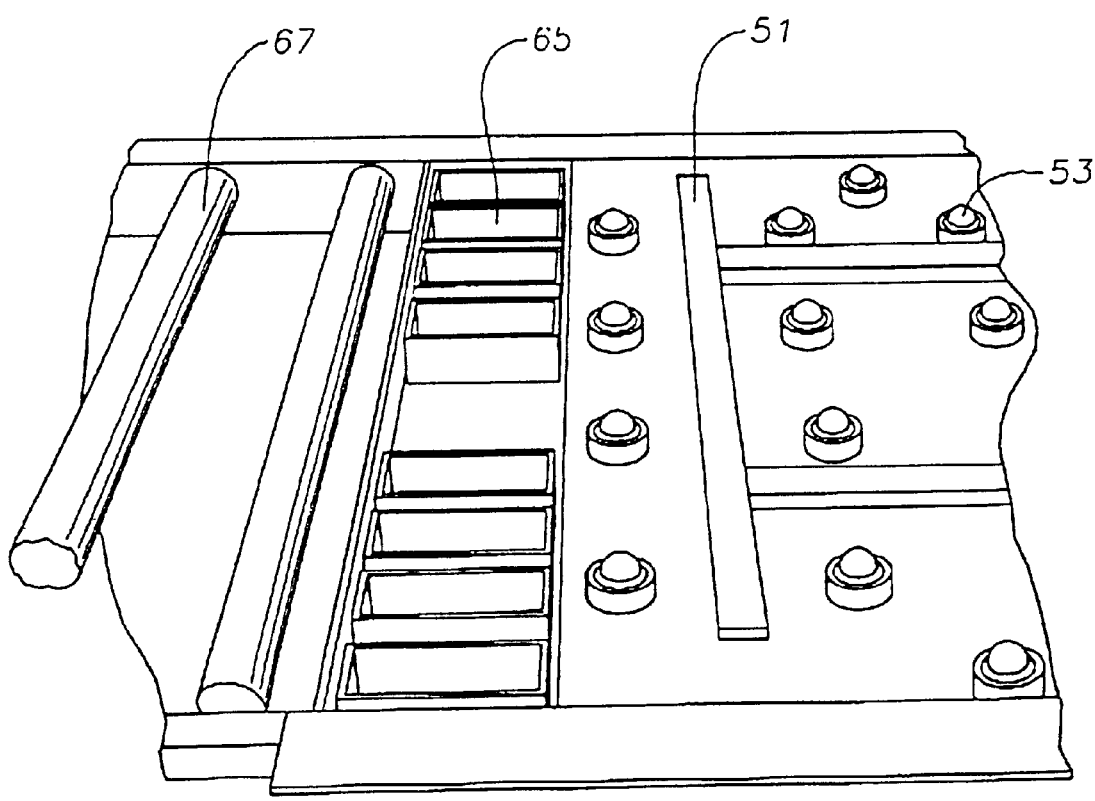
FIG. 7 is an enlarged isometric drawing of a portion of the station of FIG. 6.

Each cell 13 uses a progressive assembly process. The operator at the first station 43a will press a call button and step on a foot pedal which will lower an "H" stabilizer 51 (FIGS. 2 and 7) and bring a tote 19 into his station 43a on a ball surface 53. The first assembly station 43a has a scissor lift (not shown) so that the height of the station 43 can be adjusted to suit the operator. In the embodiment shown, the operator must first move the main workpiece or chassis 57 (FIG. 4) onto the adjacent work surface 59, then remove the tote 19 and slide it onto the tote table 61 (FIG. 6). The tote table 61 has an adjustable slanted surface which makes it easier for the operator to retrieve parts. The operator may lower the "H" stabilizer 51 to rotate the unit as necessary. The operator performs all required scanning at this station 43 and creates a test diskette (not shown). Since none of the other assembly stations 43 in the cell 13 are required to scan the unit, this is the only station 43 with a client or work-in-process.

Figure 3:
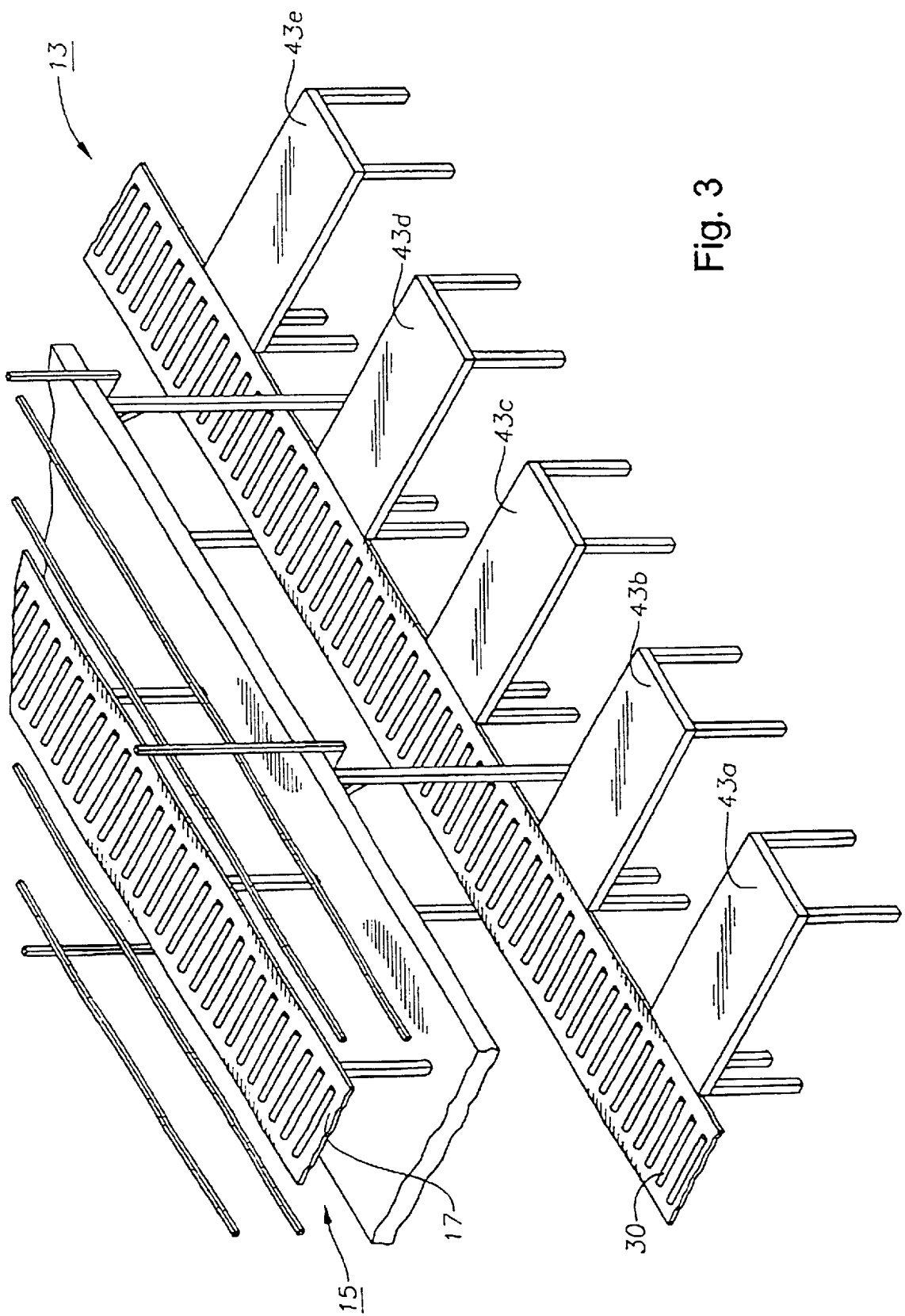
FIG. 3 is an alternate perspective view of the assembly and materials handling portions of FIG. 1.
Figure 8:
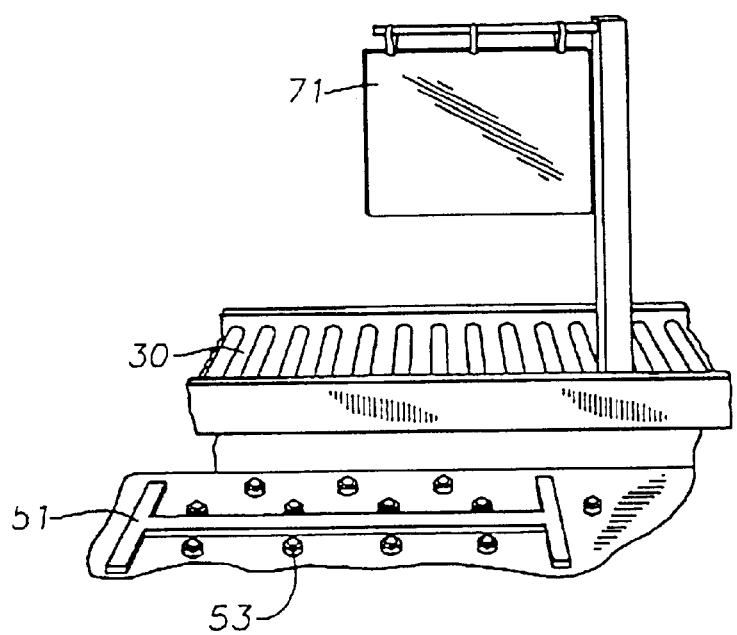
FIG. 8 is a perspective view of a flip chart for the station of FIG. 6.

The operator completes their portion of the assembly and passes the tote 19 to the next station 43b (FIG. 3). The second, third, and fourth stations 43b, 43c, 43d are utilized as needed based on particular product requirements for assembly. The fifth station 43e completes the build and passes the unit to configuration. At station 43e, the empty tote 19 is sent out onto the conveyor lift 41 (FIG. 1) that returns it to the kitting area 21. Each assembly station 43 is responsible for inspecting the work performed at the previous station 43. If any of the stations 43 are not required, there is a bypass switch which will keep the "H" stabilizer 51 lowered and a guard rail is raised. Each station 43 has troughs 65 (FIG. 7) located between the conveyor rollers 67 for small parts such as screws and clips. The troughs 65 are located below the rollers 67 so that the trays 31 and totes 19 roll over them. Each station also has a flip chart 71 (FIG. 8) illustrating the manufacturing procedure. Each flip chart 71 has pictures detailing how each product is to be assembled, and what steps are to be performed at each station 43. When a new product is started, the operator moves the flip chart 71 to the correct page to quickly review the procedures for its assembly.

Figure 9:
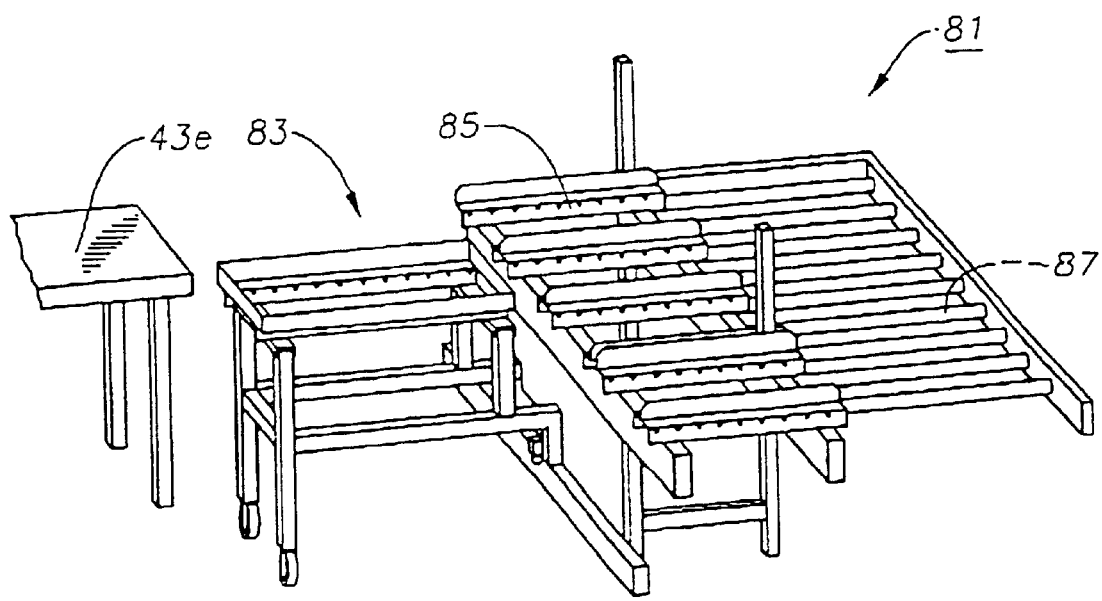
FIG. 9 is a perspective view of an assembly verification test area for the manufacturing line of FIG. 1.
Figure 10:
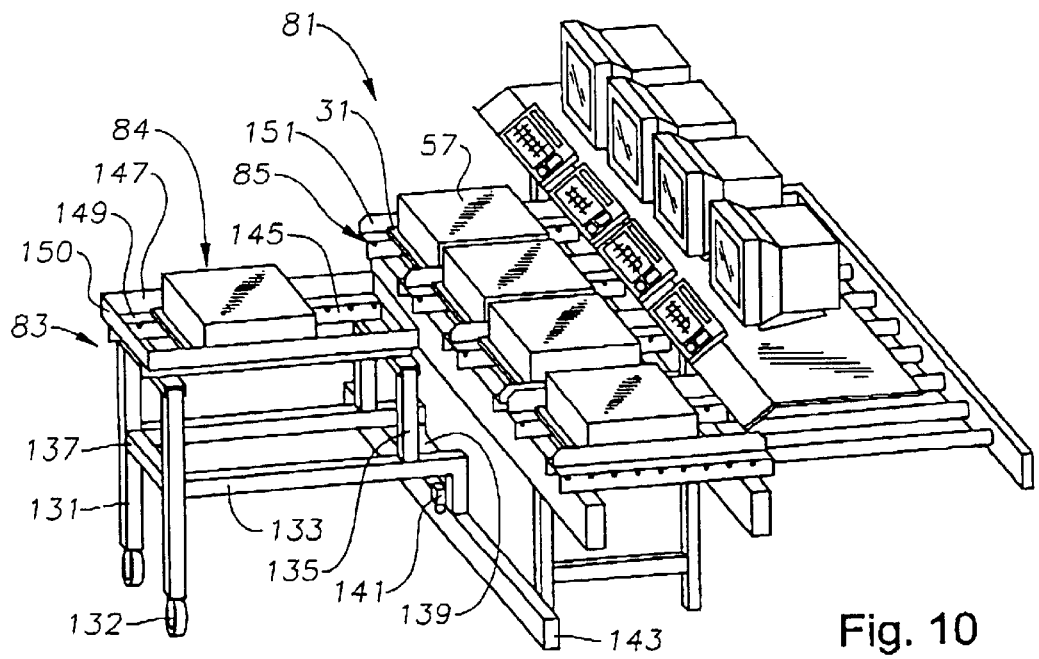
FIG. 10 is a perspective view of the test area of FIG. 9 in operation.
Figure 11:
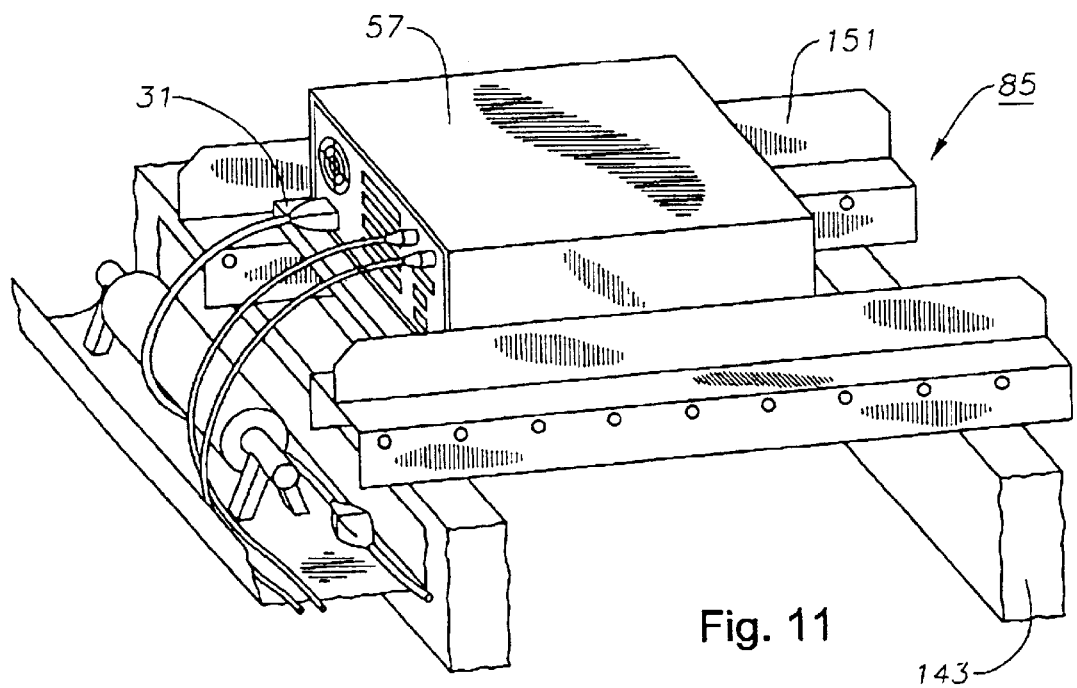
FIG. 11 is an enlarged perspective view of a station in the test area of FIG. 9.
Figure 12:
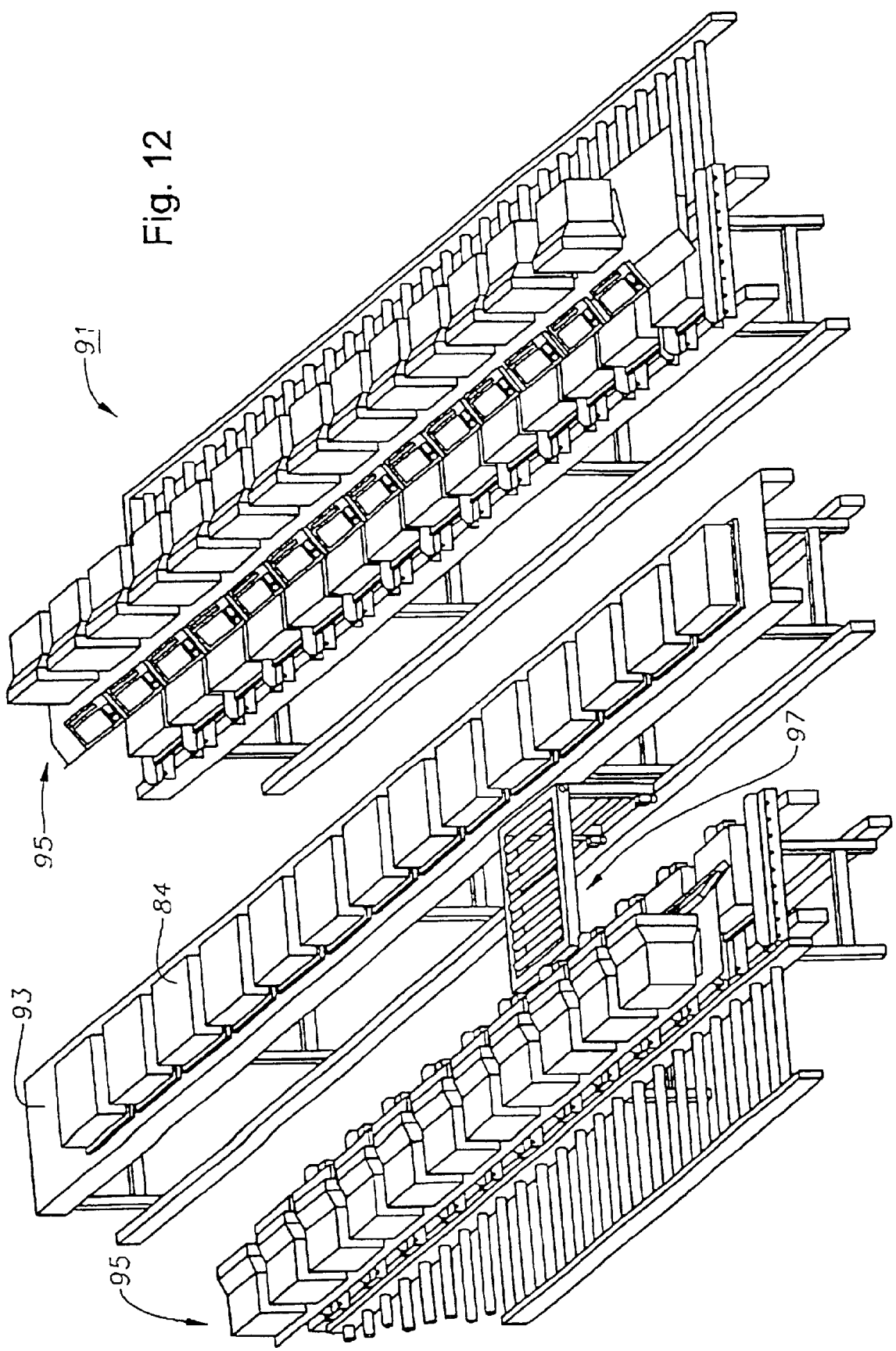
FIG. 12 is a perspective view of a system monitored operations test area for the manufacturing line of FIG. 1.
Figure 13:
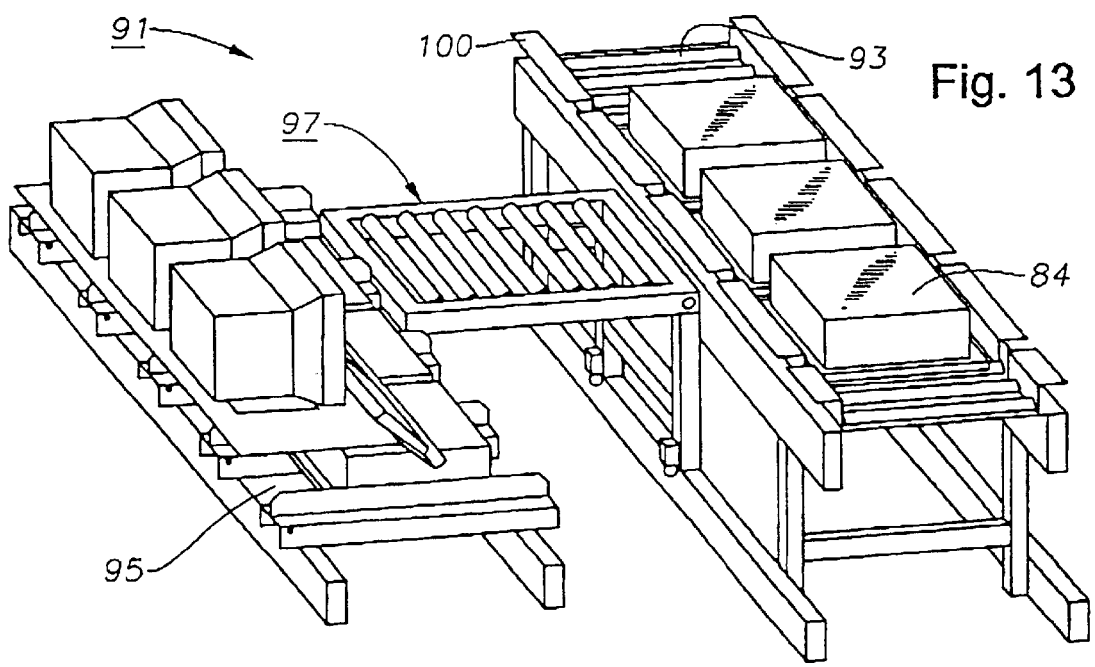
FIG. 13 is an enlarged perspective view of a portion of the test area of FIG. 12 in operation.

The next operation in the cell 13 is the configuration or assembly verification test (AVT) 81 (FIGS. 9–11). There is a sliding cart 83 attached to the configuration test area which is made of aluminum. Cart 83 is a generally square frame with a long vertical frame member 131 (FIG. 10) on each of its front corners. A wheel assembly 132 is mounted to the bottom of each member 131. A long horizontal frame member 133 extends from near the midpoint of each member 131. A pair of short vertical frame members 135 extend upward from members 133 near their rearward ends. A transverse, horizontal cross brace 137 joins members 131 and the front ends of members 133, and a brace 139 joins the rearward ends of members 133. A set of wheels 141 are attached to brace 139 to movably support the rearward end of cart 83 on a track in the chassis 143 of AVT 81. When cart 83 is properly aligned with a test slot 85, wheels 141 locate in a detent in the track of chassis 143 to indicate to the operator that cart 83 is in position. Note that wheels 141 are vertically offset from wheels 132 and do not touch the floor. The upper ends of members 131, 135 are joined by horizontal frame members 145 which extend laterally. A pair of guide rails 147 with rollers 149 extend longitudinally (from front to back) on top of members 145. Rails 147 are precisely spaced apart to closely receive trays 31 and are vertically aligned with the end of station 43e (FIG. 9) for receiving trays 31 therefrom. Wheels 132 and 141 allow cart 83 to move laterally from side to side along the length of chassis 143 so that cart 83 may be easily repositioned in front of any of the parallel test slots 85 of AVT 81. Cart 83 also has front and rear mechanical stops 150 that the operator flips down to slide a unit into a slot 85. The stops 150 prevent the unit from accidentally falling off cart 83. Each test slot 85 has a pair of guide rails 151 (FIG. 11) which are configured similarly to rails 147 for receiving trays 31. Rails 151 are mounted on top of chassis 143 and vertically align with rails 147.

The operator places the cart 83 into position at the end of station 43e, orients the unit 84 properly on the cart 83, and then moves cart 83 to an open test slot 85. The operator pushes the unit into the test slot 85 and moves the cart 83 out of the way. The machine is plugged in and the test is started (this test is done over the LAN). The AVT 81 consists of six test stations 85. Each test station 85 is independent of the next, allowing multiple machines to be tested at the same time without requiring the same startup time. All cable routing is built into the test stations 85 (FIG. 11). Once a unit passes the test, the operator steps on a pedal to drop a hard stop and raise the ball transfer. The operator pushes the unit onto a power conveyor 87 (FIG. 9) located directly behind the test stations 85. If a machine fails test, the operator notifies the responsible assembly team of the cause and, if possible, repairs the machine at this location. If necessary, the operator unplugs the unit, puts it back on the cart 83, and moves the unit to an adjacent debug queue.

Figure 14:
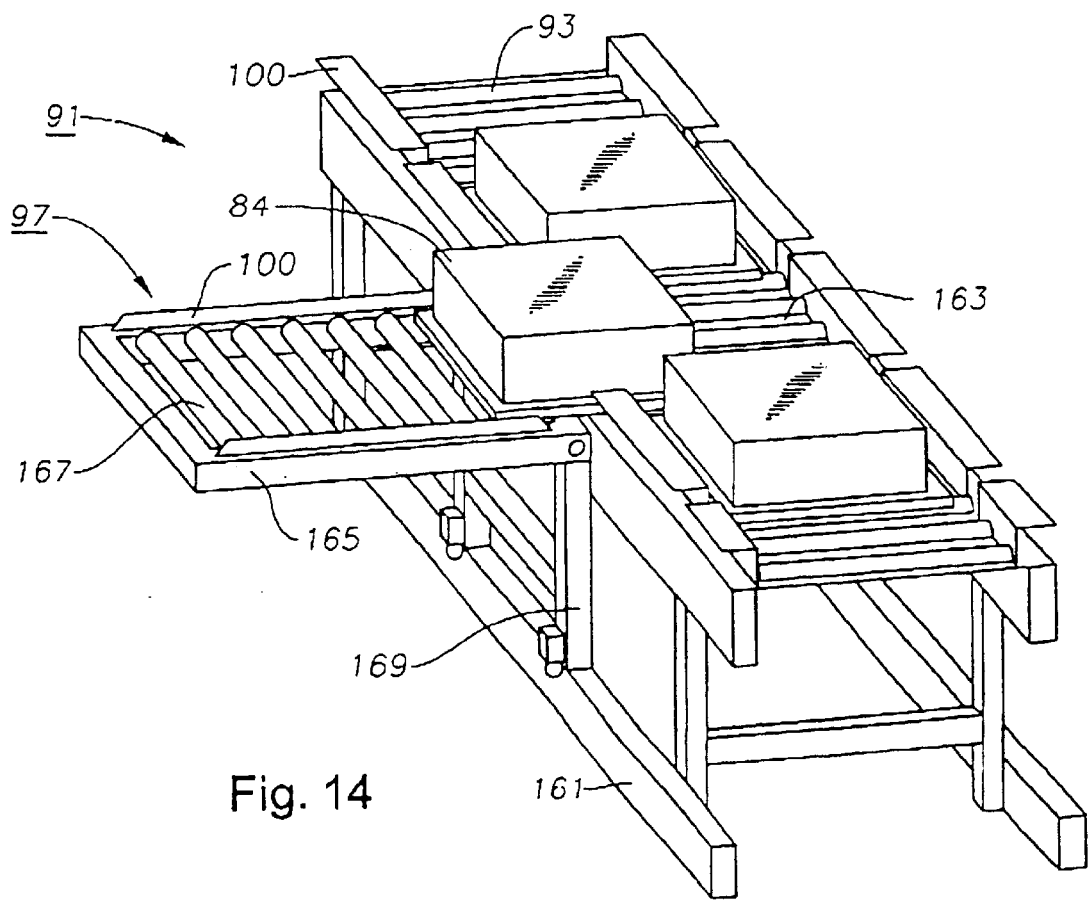
FIG. 14 is an enlarged perspective view of a portion of the test area of FIG. 12 at an advanced stage of operation.

The remainder of the tests, except for the hi-pot test, are performed in a system monitored operations (SMOPS) test area 91 (FIGS. 12–15) which is located within cell 13. The SMOPS 91 operator pulls a unit 84 that exited AVT 81 onto the gravity center spur 93 and moves it across from an empty test station 95. Gravity spur 93 is approximately 50 feet long with twenty two test stations 95 on each side. There is a pivotal, sliding lift gate 97 on each side of spur 93. Gate 97 is pivotal between substantially vertical and horizontal positions. Gate 97 can be moved along the length of spur 93 when it is up or down. The operator will move the lift gate 97 adjacent to the test slot 95 that is to be loaded. When the lift gate 97 is in place, a ball transfer (not shown) on spur 93 automatically raises and guard rails 100 on spur 93 and gate 97 drop, allowing the operator to slide the unit 84 into the test slot 95 (FIG. 14). The lift gate 97 is moved out of the way, the unit plugged in, and the run-in test is started. Once run-in is completed, pre-load automatically begins. Both run-in and pre-load are done over the LAN.

Each lift gate 97 is hingably connected to spur 93 which has a lower frame or chassis 161 (FIG. 14). The ball transfers are located between a plurality of longitudinal rollers 163. The guard rails 100 are located along the sides of the rollers 163 on spur 93, and guard rails 100 on gate 97 are on each of its ends. Gate 97 itself is a rectangular frame 165 with rollers 167 that allow units 84 to slide transversely off of spur 93 into test slots 95. Each gate 97 has a pair of vertical, parallel support legs 169 that are slidably mounted to a lower portion of chassis 161. Note that it is only the upper frame 165 of gate 97 that pivots. Legs 169 are fixed from motion except for the ability to slide along chassis 161.

If the unit includes the LAN card as part of the bill of materials, the verification test also starts automatically over the LAN. If the unit does not include a LAN card, the slave card is removed while the unit is in the test station 95 (the operator is prompted by the test code to remove the card). There is a longitudinally movable card removal station 171 (FIG. 15) over the center gravity conveyor 93 where the removed card is scanned out of the unit. Station 171 comprises four corner support legs 173 which elevate a shelf 103 above spur 93. Shelf 103 rotates on top of station 171 so operators on both sides of spur 93 can use it. It also has a roll-out shelf 105 where an ESD box 107 is kept for storing the removed cards. Once the card has been removed, the verification test is initiated from the test diskette created at the first assembly station 43a. The results of the test are written to the diskette.

The unit 84 is moved on the center gravity spur 93 to the hi-pot test station 111 (FIG. 17). There, the results of the verification test are uploaded from the diskette by the client, and the hi-pot test is initiated. Any units containing Radio Frequency Identification (RFID) are automatically tested to insure that they are functioning properly. Once the unit has passed, the operator steps on a pedal which drops the hard stop and raises a ball transfer. The unit is pushed out of the cell 13 onto a power conveyor and routed to the packaging station 23 (FIG. 17). Packaging 23 is the only step not in cell 13 due to the bulk of material required.

Figure 16:
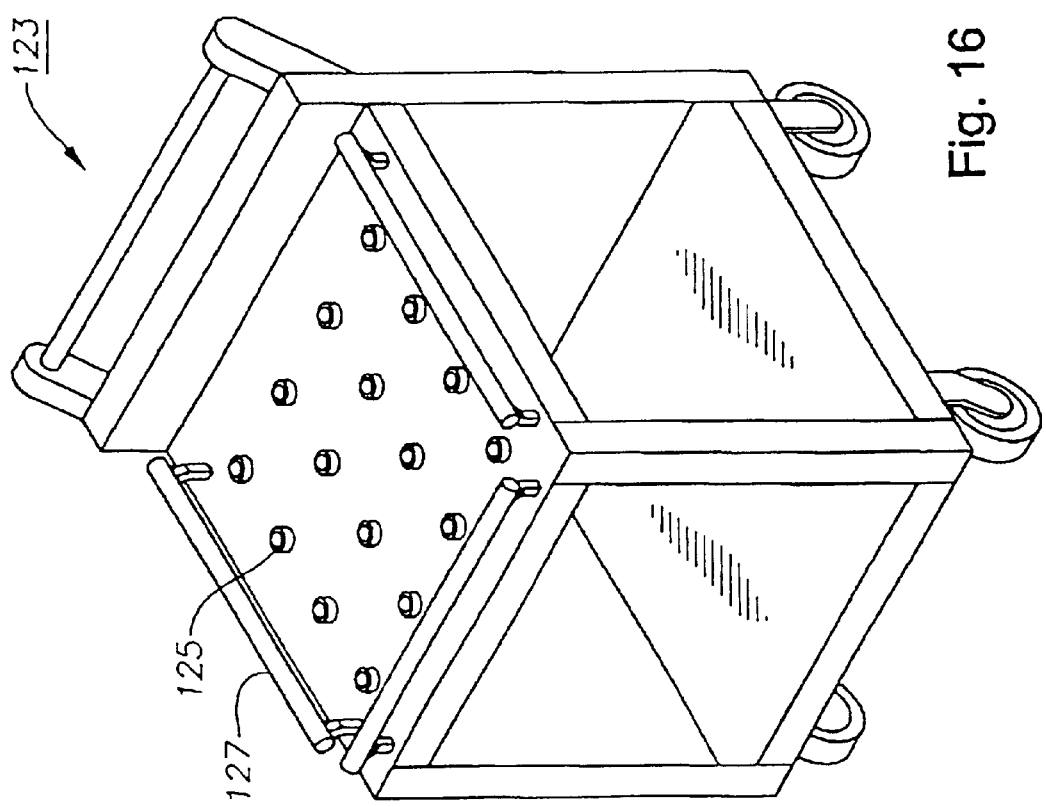
FIG. 16 is a transport cart for the manufacturing line of FIG. 1.
Figure 15:
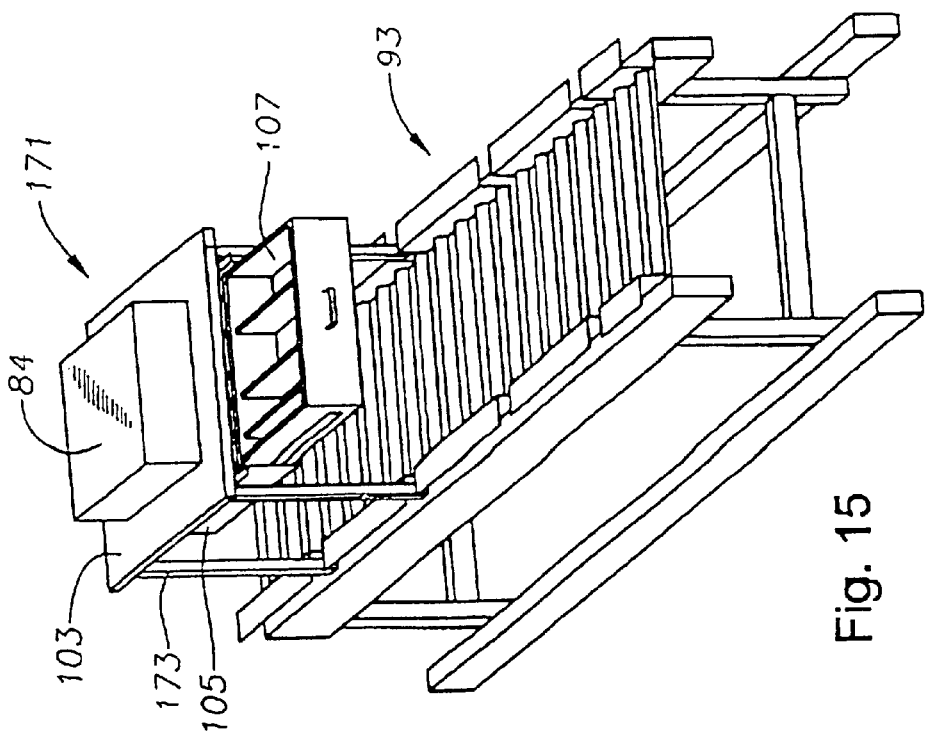
FIG. 15 is a perspective view of a card removal station for the test area of FIG. 12.

If a unit fails at any location, minor debug can be performed at the test station (as long as a commodity change is not required). If the debug process is determined to be time consuming or a commodity change is required, the unit is moved to debug 121 via a cart 123 (FIG. 16). The debug area 121 is located between SMOPS 91 and assembly to help expedite feedback to the assemblers. The carts 123 are made of aluminum and have ball surfaces 125 with adjustable side rails 127. The debug operator will pull units into their workbench, either from the adjacent gravity conveyor queue or the carts 123. The debug operator will use parts from another tote 19 to determine the cause of the failure. Once the failure has been verified, the debug WIP area is called to request a replacement for the failed part. A debug WIP runner has a scooter and delivers the replacement parts to all 24 cells 13 as required. The failed part is taken to manufacturing quality assurance (MQA). There are three debug benches in each cell 13 so the debug operator can work on another unit while waiting on the replacement part. This process prevents the buildup of WIP in cells 13 and accommodates smaller jobs by removing the need to store a large variety of parts in each cell. MQA can then determine if the commodity failure is manufacturing induced or vendor induced. Once the unit is repaired, the AVT 81 is repeated at the debug station 121 to confirm that the problem was fixed and no others exist. The unit is then returned to SMOPS 91 using the carts 123.

The invention has several advantages. The problems of efficiently building and testing both small and large jobs are overcome using a combination of cells and a material handling backbone. The material handling system is used to deliver totes from the kitting area to the correct cell and from the cell to pack. Both the conveyor system for tote delivery and the cells are custom designed. The AVT cart is capable of efficiently handling products as they arrive from assembly, and transporting them to the test area with minimal effort by the operators. This process works well for any job size as the change-over from one product to another is seamless. Manufacturing controls what cells build which product through the MHS. Totes are requested by the cell based on the current job and next job assigned. The pictorial flip chart allows the operators to quickly familiarize themselves with differences between products. Manufacturing can optimize this with MHS by assigning the types of products consistently to the same cells, using higher skilled cells for the most frequent changes.

There is no setup time for test and pre-load except for the first time a new product is manufactured. The test code and pre-load are available via the LAN and diskette, so every unit in the test area could be different with minimal impact. All results from the test are recorded over the LAN so all units have a quality history available. WIP levels are minimized and parts tracking is simplified as all parts within manufacturing are either assigned to a specific unit or belong to debug WIP (excluding small parts). Efficiency is optimized by having inspection built into the assembly process. The kitting process ensures all parts needed for that unit are available in the tote, with items such as screws being kept at each station in the parts troughs. By using progressive assembly, the learning curve is improved allowing operators to quickly be used on the line. Cross training continues from that point allowing the assembler to learn other portions of assembly and test gradually. The immediate feedback on failures prevents the assemblers from continuing to make the same mistake. With close proximity to test and minimal queue, the impact of workmanship errors is readily understood—encouraging teamwork and higher quality. Cycle time is optimized by implementing independent testing stations. Each unit can be immediately tested and moved rather than depending on a full batch to start, and that the whole batch passes before it can proceed. If the repair can be done at the test slot, handling and move time can be eliminated.

While the invention has been shown or described in only some of its forms, it should be apparent to those skilled in Lo the art that it is not so limited, but is susceptible to various changes without departing from the scope of the invention.

We claim:

1. A method of transferring product, comprising the steps of:

providing a product output device having a longitudinal axis;

providing a test area spaced apart from the product output device and having a plurality of longitudinal, parallel test stations with guide rails mounted to a laterally-oriented chassis, the chassis being substantially perpendicular to the guide rails of the test stations;

locating a transfer vehicle between the product output device and the test area and mounted to the chassis, the transfer vehicle having a frame with a set of guide rails mounted on an upper end, the guide rails of the transfer vehicle being substantially level with the product output device and substantially parallel to the guide rails of the test stations;

receiving and supporting a product with rollers on the transfer vehicle from the product output device;

preventing the product from accidentally falling off the cart with a set of movable mechanical stops on the transfer vehicle;

engaging the chassis with a first set of wheels on the transfer vehicle;

moving the transfer vehicle laterally relative to the product output device and the test area while engaging the floor with a second set of wheels mounted to a lower end of the transfer vehicle, the second set of wheels being vertically offset from the first set of wheels;

repositioning the transfer vehicle with the product in front of one of the test stations of the test area; and offloading the product into said one of the test stations for testing.

2. The method of claim 1, further comprising the step of receiving one product at a time with the transfer vehicle from a single delivery point of the product output device, and delivering the product to one of six test stations of the test area.

3. The method of claim 1, further comprising the step of receiving products from the test stations that have been tested with a power conveyor located opposite the transfer vehicle adjacent to the test area.

* * * * *